(No Model.)  6 Sheets—Sheet 1.

H. CASEBOLT.
Endless Cable Way.

No. 239,726.  Patented April 5, 1881.

Witnesses
J. Walter Fowler.
A. K. Evans.

Inventor;
Henry Casebolt
by A. H. Evans & Co.
Attys.

(No Model.) 6 Sheets—Sheet 3.

H. CASEBOLT.
Endless Cable Way.

No. 239,726. Patented April 5, 1881.

Witnesses:
Walter Fowler,
A. K. Evans.

Inventor:
Henry Casebolt
by A. H. Evans & Co
Attys (No Model.)  6 Sheets—Sheet 4.

H. CASEBOLT.
Endless Cable Way.

No. 239,726.  Patented April 5, 1881.

Witnesses:
Walter Fowler.
R. K. Evans

Inventor
Henry Casebolt
by A. H. Evans & Co.
Attys (No Model.) 6 Sheets—Sheet 5.
H. CASEBOLT.
Endless Cable Way.
No. 239,726. Patented April 5, 1881.
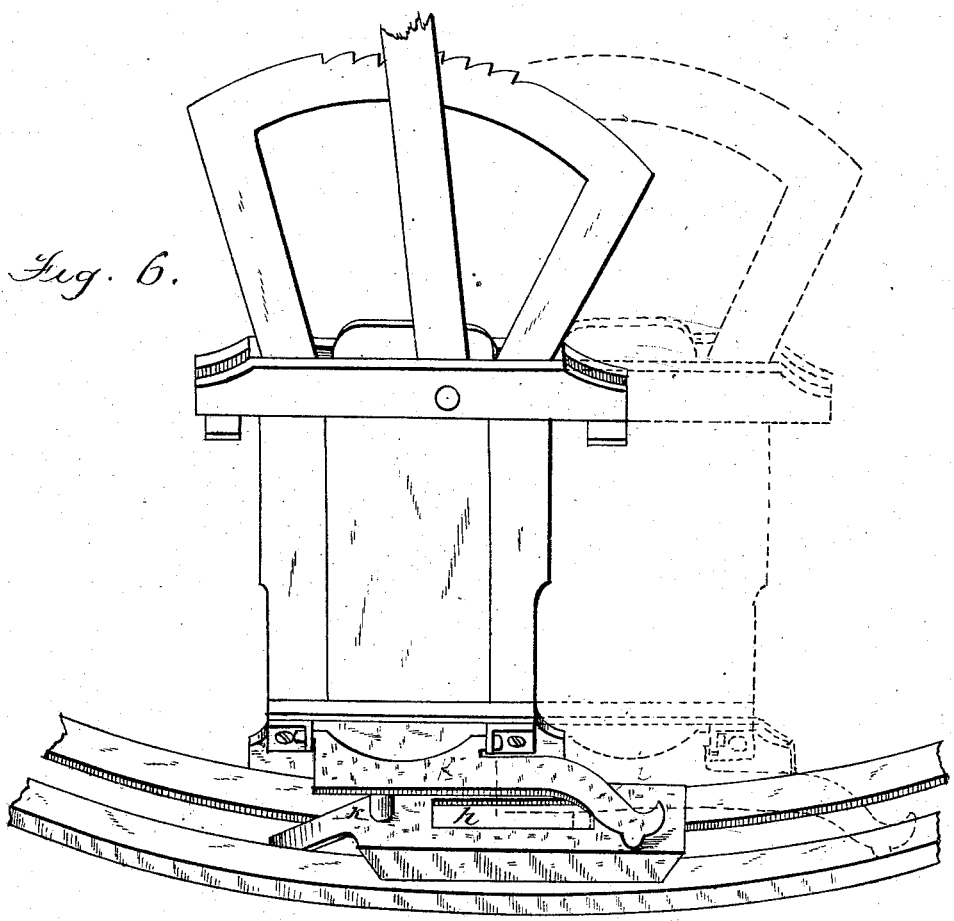
Fig. 6.
Fig. 7.
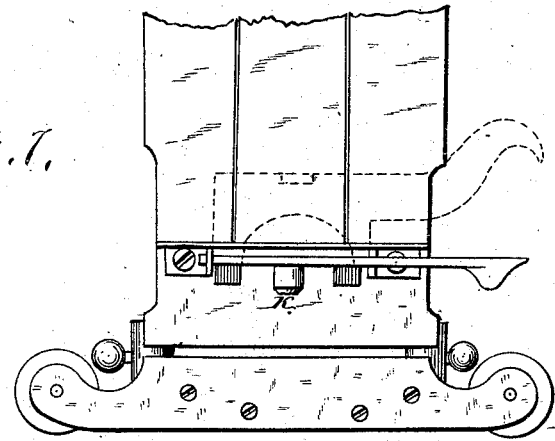
Witnesses
Walter Fowler
R. K. Evans
Inventor;
Henry Casebolt
by A. H. Evans & Co
Attys.

(No Model.)  6 Sheets—Sheet 6.
H. CASEBOLT.
Endless Cable Way.
No. 239,726.  Patented April 5, 1881.
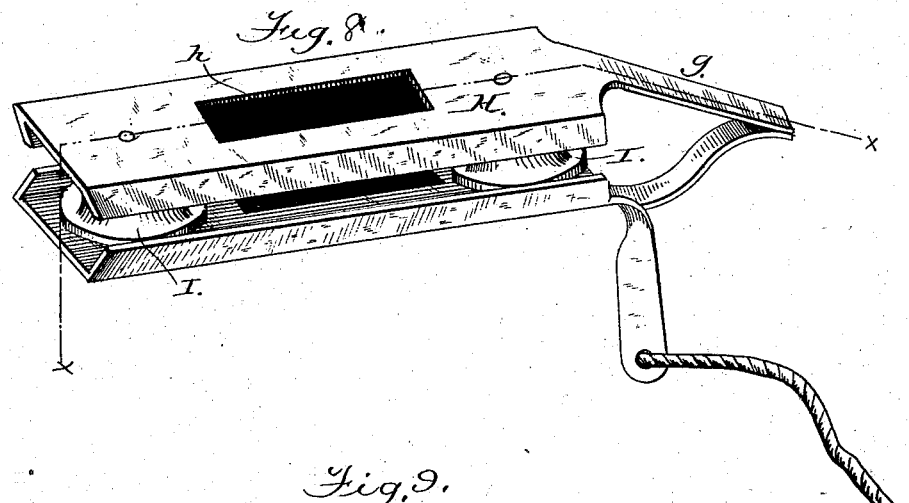
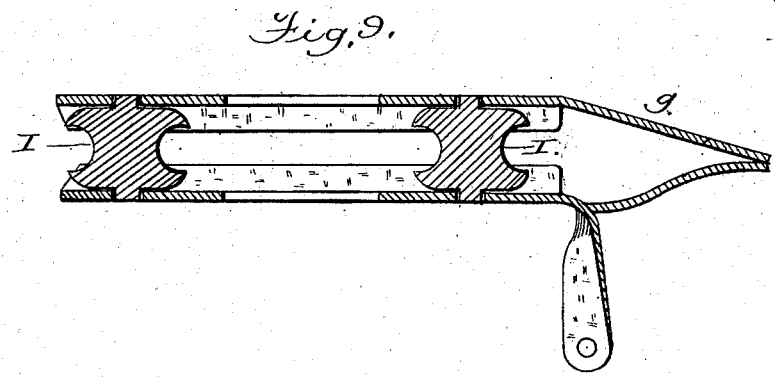
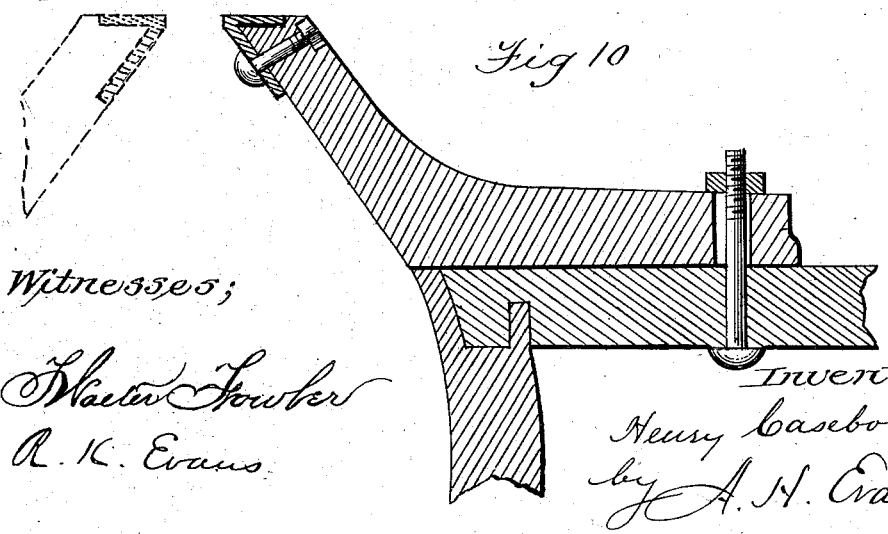
Witnesses:
Walter Fowler
R. K. Evans
Inventor:
Henry Casebolt
by A. H. Evans & Co.
Attys.
N. PETERS, PHOTO-LITHOGRAPHER, WASHINGTON, D. C.

UNITED STATES PATENT OFFICE.

HENRY CASEBOLT, OF SAN FRANCISCO, CALIFORNIA.

ENDLESS CABLE-WAY.

SPECIFICATION forming part of Letters Patent No. 239,726, dated April 5, 1881.

Application filed January 29, 1881. (No model.)

*To all whom it may concern:*

Be it known that I, HENRY CASEBOLT, of the city and county of San Francisco, and State of California, have invented certain Improvements in Endless Cable-Ways; and I hereby declare the following to be a full, clear, and exact description thereof, reference being had to the accompanying drawings, making part of this specification, in which—

Figure 1:
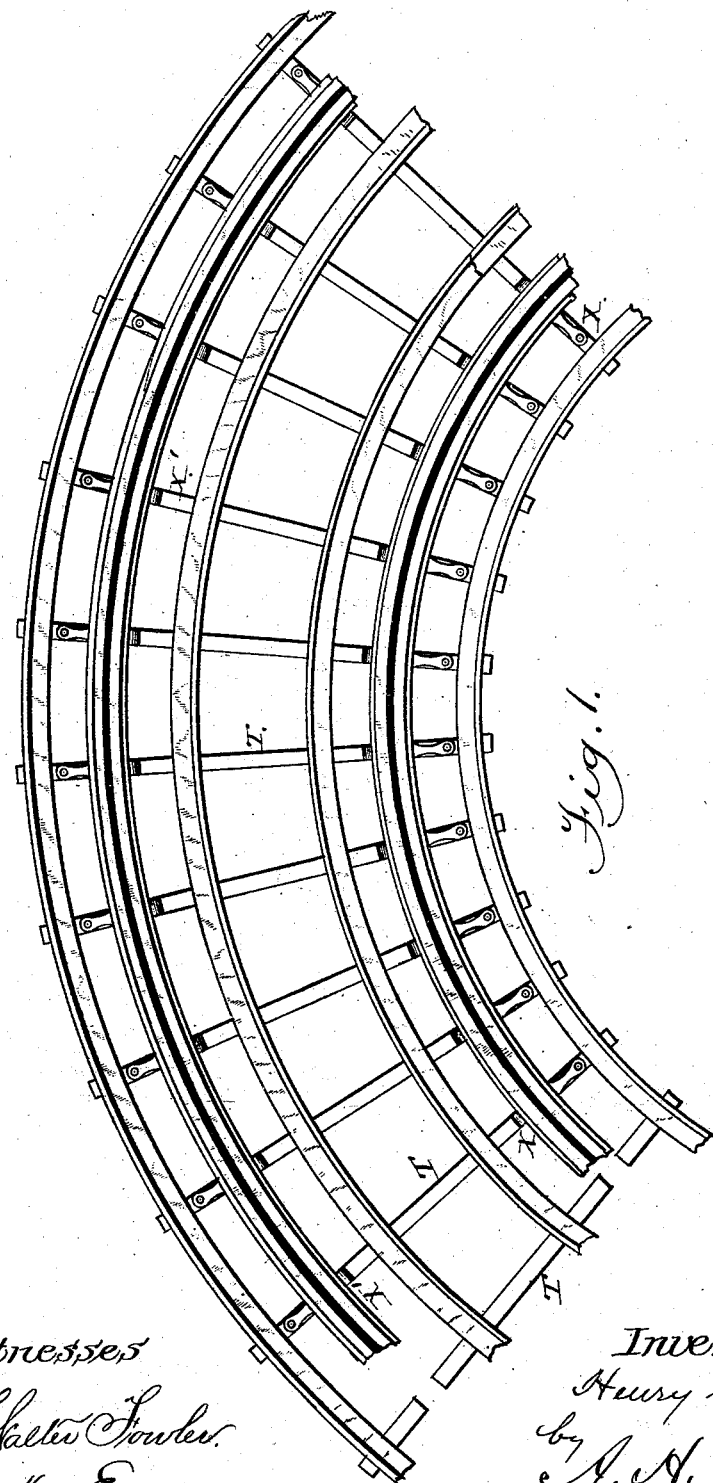
Figure 2:
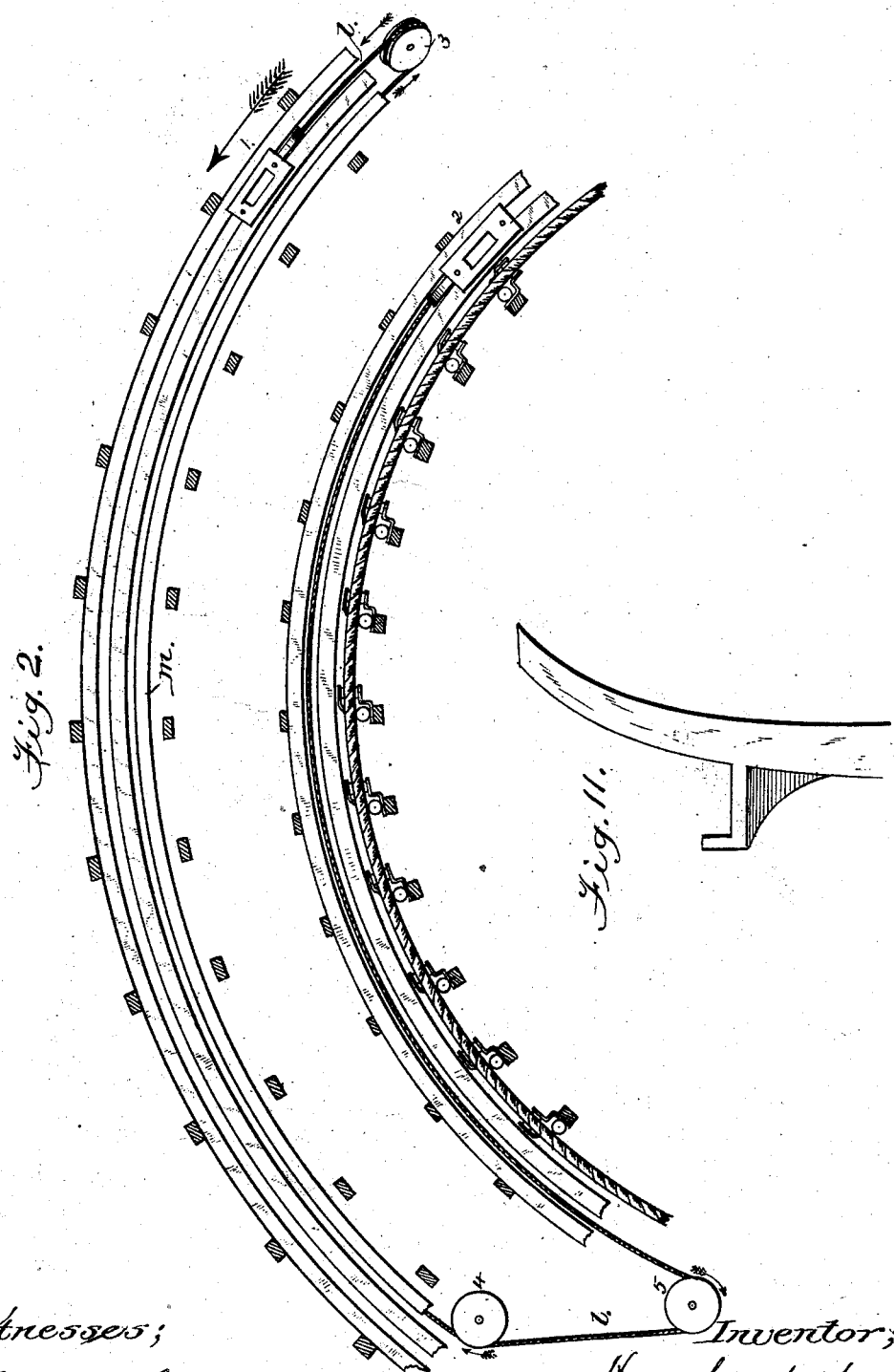
Figure 3:
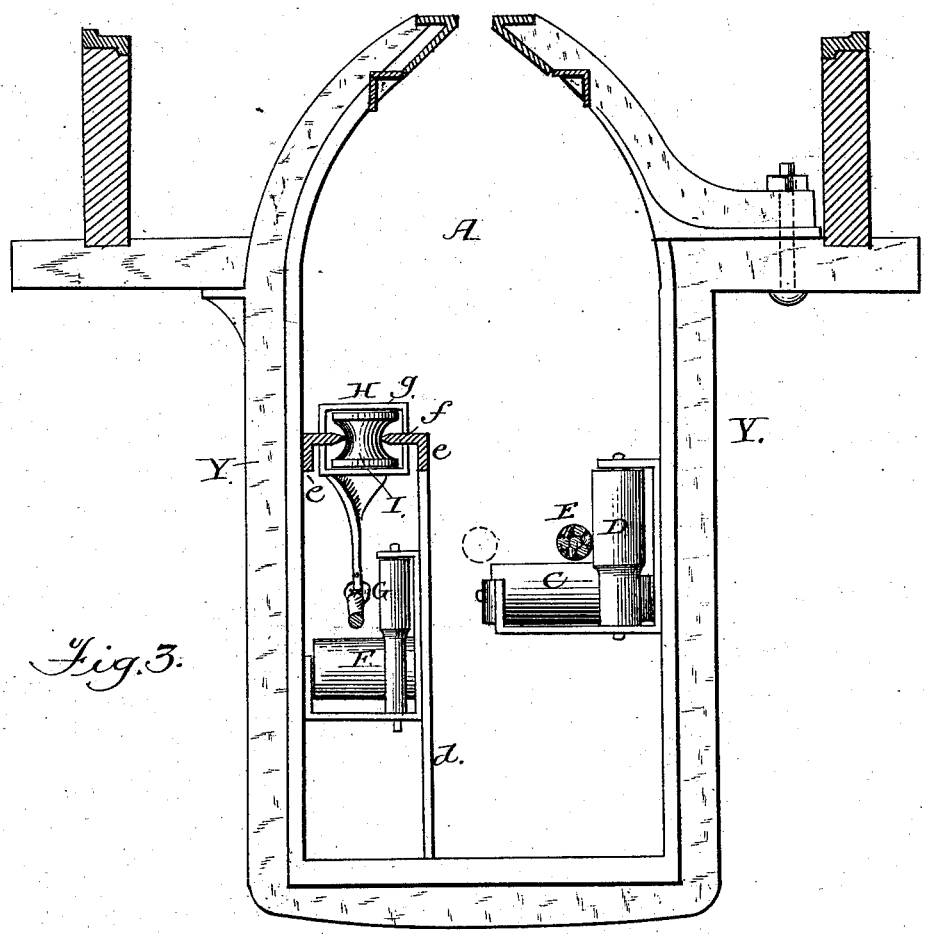
Figure 5:
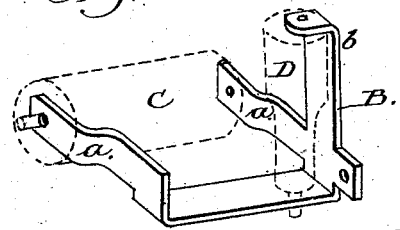
Figure 4:
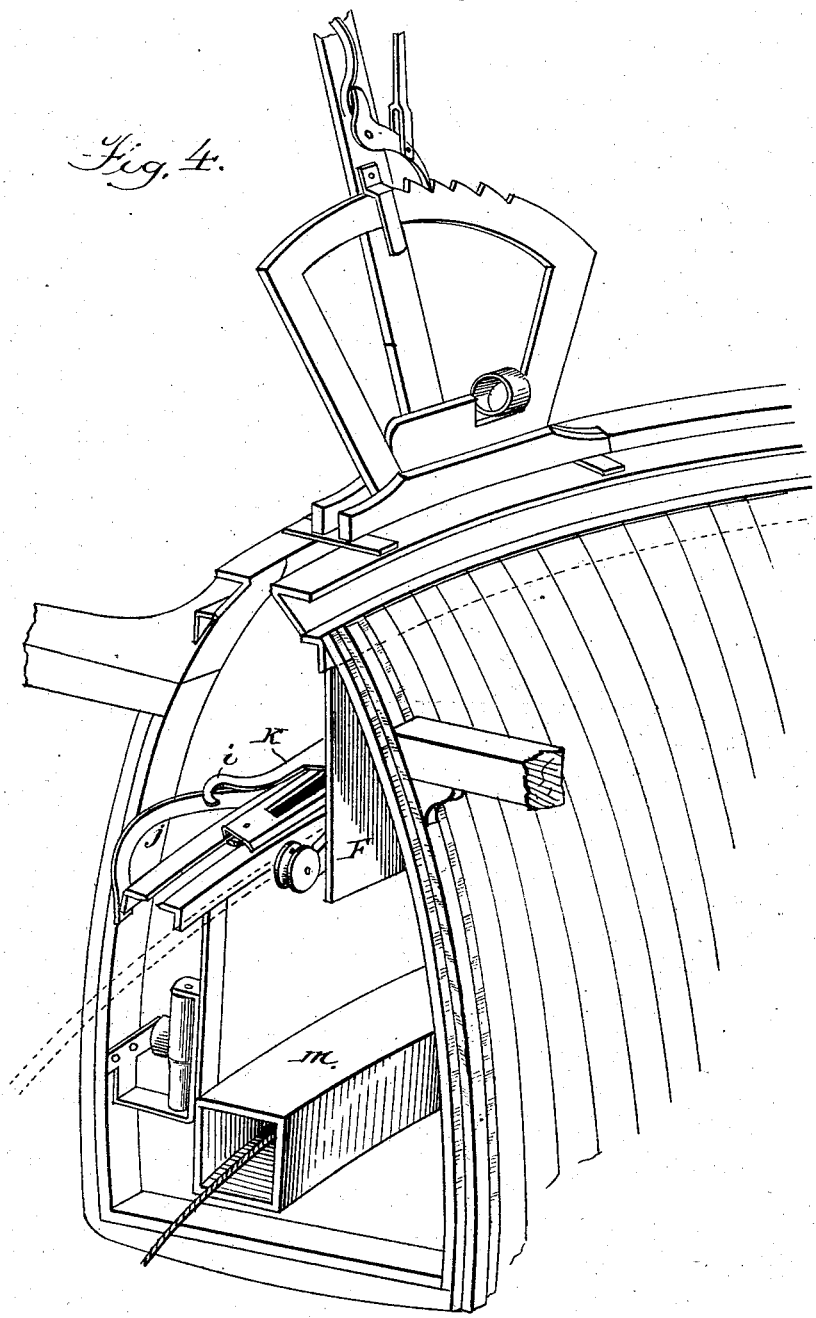

Figure 1 is a general plan view of my invention. Fig. 2 is a horizontal sectional view taken on a line immediately beneath the railroad-ties. Fig. 3 is an end view, looking into the tunnel. Fig. 4 is a perspective view, looking into the tunnel, and showing the gripe disengaging itself from the carriage. Figs. 5 to 11, inclusive, are details to be referred to.

My invention appertains to that class of endless cable-ways particularly adapted to propelling cars on street-railways, and has especially for its object to facilitate the turning of curves in the road. In ways of the description named the main cable will necessarily hug the short side of the curve in the tunnel on account of the tension on it. This operation, in the absence of any counteracting agency, would tend to draw the griper, which has hold of the cable, out of a vertical line and toward the short side of the curve. Consequently the griper would bind in the slot and interrupt the travel of the car. To overcome this difficulty is the main object of my invention.

My invention consists, first, in placing within the tunnel a movable carriage on the long side of the curve and adapted to engage with the griper and conduct it around the curve; secondly, in a griper provided with a latch adapted to engage a traveling carriage to conduct the griper around the curve; thirdly, in the combination of a traveling carriage within the tunnel, a gripe provided with a latch having a projecting arm, and a curved bar for releasing the latch from the carriage; fourthly, in the details of construction of the traveling carriage and its supports; fifthly, in an improved bracket for the support of the guide-rollers within the tunnel; sixthly, in the arrangement of devices for automatically moving the traveling carriages back to their initial points after the car has passed around the curve; seventhly, in a continuous tie passing from the slot-rail in the center of one track to the slot-rail in the center of the adjacent track.

In order that those skilled in the art may make and use my invention, I will proceed to describe the manner in which I have carried it out.

In the said drawings, A is the tunnel, made after the manner shown and described in Patent No. 237,814, granted to me February 15, 1881, and constructed on a curve. Within the tunnel, and on the short side of the curve, are a series of brackets, B, provided with arms $a$ $a$ and $b$, to sustain guide-rollers C D, on which runs the main cable E. On the long side of the curve in the tunnel, supported by posts $d$ and the yokes of the tunnel, are angle-iron rails $e$ $e$, and below them are rollers F G, similar to but smaller than rollers C D. On the rails $e$ $e$ travels a carriage, H, having interior rollers, I, and slots $f$, through which project rails $e$ $e$, and on its top a slot, $g$. At one end of the carriage is a depressed tongue, $h$. The bearings through the slots $f$ and the interior rollers, I, enable the carriage H to be moved freely back and forth on the rails $e$ $e$. The gripe J has swung to its side a latch, K, having on its lower surface a downwardly-projecting lug, $k$, and at its forward end a curved disengaging-arm, $i$. By any suitable stop or hinge the latch K, in its normal position, is kept in a plane at right angles to the plane of the gripe-shank, but is capable of a free upward movement. The disengaged arm I, toward its end, is curved slightly outward and upward to pass over and clasp an inclined bar, $j$, as the carriage H approaches the limit of its travel in conducting the gripe around the curve.

In operating these devices for turning curves on double-track roads I time the cars so that they pass the curve alternately in opposite directions, and provide devices whereby the passing of a car in one direction leaves the carriage in a position to conduct the griper of the next car passing in the opposite direction on the adjacent track around the curve. This is seen illustrated in Fig. 2, where the carriage designated 1 has attached to its ends having the depressed tongue a cord, $l$, which passes over pulley 3, located at the end of the curve, back through the tunnel inclosed in housing M, around pulley 4, then around pulley 5, through the tunnel in the opposite track to carriage 2, where it is attached to the end bearing the downwardly-projecting tongue. Throughout its course within the tunnels A the cord $l$ is guided and supported by the minor pulleys F G.

The operation of the devices for conducting the griper around the curve is as follows: A car approaching the curve on the outer track in the direction shown by the larger arrow will bring the lug $k$ projecting from the lower surface of the latch K in contact with the depressed tongue $g$ on the carriage H, causing the latch to rise until the lug has passed on top of the carriage and drops into the slot $g$. This attaches the gripe to the carriage, and as the main cable moves the gripe forward the carriage supported by rails $e\ e$ sustains the gripe against the tendency of the cable to draw it toward the short side of the curve and keeps it directly beneath the slot, thereby preventing it from binding against the slot-rails. In this condition the gripe passes around the curve, the carriage moving with it. As the gripe reaches the end of the curve the releasing-arm $i$ of the latch K comes in contact with the inclined bar $j$, rides up over, raises latch K, and with it lug $k$, out of slot $g$, and releases the carriage H. This movement of one of the carriages, as is evident, through the medium of cord $l$, will bring the carriage within the tunnel of the opposite track into a position to be picked up by the gripe of a car moving in an opposite direction, the operation being repeated on the passage of each car.

In the construction of this class of roads with double tracks I have experienced great difficulty in attaining a rigidity of the framework sufficient to sustain all required strain. By experiment I have found that by laying a continuous tie, T, from the yoke X on one side of the tunnel of one track to the yoke Y (see Fig. 1) of the tunnel of the adjacent track, and bearing one rail of each of the tracks, will accomplish the desired result, and so materially strengthen the structure as to greatly enhance its wearing capacity.

Having thus described my invention, what I claim as new, and desire to secure by Letters Patent, is—

1. In an endless cable-way, a movable carriage placed within the tunnel and adapted to conduct the gripe around a curve, for the purpose set forth.

2. A griper, J, provided with an automatic catch or latch, K, adapted to engage a device for conducting the gripe around the curve, for the purpose specified.

3. In an endless cable-way, the combination of a traveling carriage within the tunnel, a gripe provided with a latch having projecting arm $i$, and the inclined releasing-bar $j$, substantially as and for the purpose set forth.

4. The carriage H, provided with the slots $f$ to receive the rails $e$, interior rollers, I, and depressed tongue $h$, all constructed and arranged as and for the purpose set forth.

5. The supports $d$ and the angle-iron rails $e$, in combination with the carriage H, slotted at $f$, as and for the purpose described.

6. In an endless cable-way, the roller-sustaining bracket B, provided with the arms $a$ $a$ and $b$, as described.

7. A pair of gripe-conducting carriages arranged beneath adjacent tracks, in combination with pulleys 3 4 5 and cord $l$, all constructed, arranged, and operated as and in the manner set forth.

8. In an endless cable-way, the continuous tie T, extending from the tunnel-yoke of one track to the tunnel-yoke of the adjacent track, and bearing one rail of each track, substantially as and for the purpose set forth.

HENRY CASEBOLT.

Witnesses:
 JNO. L. CONDRON,
 R. K. EVANS.